(12) United States Patent
Tsao et al.

(10) Patent No.: US 8,301,305 B2
(45) Date of Patent: Oct. 30, 2012

(54) MOVING DEVICES AND CONTROLLING METHODS THEREFOR

(75) Inventors: Chuan-Ching Tsao, Taipei County (TW); Yung-Shen Lee, Taipei (TW); Shih-Chieh Chou, Taipei County (TW); Hong Lun Liu, Hualien County (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 456 days.

(21) Appl. No.: 12/728,803

(22) Filed: Mar. 22, 2010

(65) Prior Publication Data

US 2011/0130874 A1 Jun. 2, 2011

(30) Foreign Application Priority Data

Nov. 27, 2009 (TW) .............................. 98140518 A

(51) Int. Cl.
*B08B 7/04* (2006.01)
*G05B 19/18* (2006.01)
*G05B 19/042* (2006.01)

(52) U.S. Cl. ........... 700/255; 700/259; 134/56 R; 483/8; 318/576; 318/568.17; 901/1

(58) Field of Classification Search .................. 700/245, 700/255, 253, 259; 134/56 R; 483/8; 318/576, 318/568.17; 901/1
See application file for complete search history.

(56) References Cited

U.S. PATENT DOCUMENTS

| | | | |
|---|---|---|---|
| 5,995,884 A * | 11/1999 | Allen et al. ..................... 701/24 |
| 6,542,812 B1 * | 4/2003 | Obradovich et al. .......... 701/426 |
| 7,555,363 B2 * | 6/2009 | Augenbraun et al. ......... 700/253 |
| 7,720,572 B2 * | 5/2010 | Ziegler et al. ................. 700/245 |
| 7,761,954 B2 * | 7/2010 | Ziegler et al. .................... 15/320 |
| 7,957,837 B2 * | 6/2011 | Ziegler et al. ................. 700/258 |
| 2006/0074558 A1 * | 4/2006 | Williamson et al. .......... 701/213 |
| 2007/0016328 A1 * | 1/2007 | Ziegler et al. ................. 700/245 |
| 2008/0134458 A1 * | 6/2008 | Ziegler et al. .................... 15/320 |
| 2009/0177323 A1 * | 7/2009 | Ziegler et al. ................. 700/259 |
| 2009/0254218 A1 * | 10/2009 | Sandin et al. ................. 700/258 |
| 2009/0306822 A1 * | 12/2009 | Augenbraun et al. ......... 700/245 |

* cited by examiner

*Primary Examiner* — Ronnie Mancho
(74) *Attorney, Agent, or Firm* — Birch, Stewart, Kolasch & Birch, LLP

(57) ABSTRACT

A moving device is provided. A first receiving device receives an emitted light from a base station and obtains a direction from a start position, which the moving device is in to the base station according to the emitted light to serve as a target direction. A driving device drives the moving device to move in the target direction from the start position. When the moving device meets a first obstacle which is disposed along the target direction and in the target area, a second receiving device obtains a distance between the moving device and the base station according to the received emitted light to serve as a middle distance. When a determination device determines that the middle distance is not equal to a predetermined distance, the driving device drives the moving device to detour around the first obstacle and move in the target direction continuously.

14 Claims, 8 Drawing Sheets

US 8,301,305 B2

MOVING DEVICES AND CONTROLLING METHODS THEREFOR

CROSS REFERENCE TO RELATED APPLICATIONS

This application claims the benefit of Taiwan application Serial No. 98140518 filed Nov. 27, 2009, the subject matter of which is incorporated herein by reference.

BACKGROUND OF THE INVENTION

1. Field of the Invention

The invention relates to a moving device, and more particularly to a moving device and a control method to control the moving device to return to a base station.

2. Description of the Related Art

Recently, the use of robotic devices has become increasingly common in daily life, one such example is the use of cleaning robots. Cleaning robots need to return to a base station to recharge one their cleaning tasks have been accomplished.

In conventional return mode, when the cleaning robot desires to return to a base station, the cleaning robot moves along walls and maintains a fixed distance from the walls. The cleaning robot looks for an encoding signal which is emitted from the base station, and encoding signal enables the robot to identify the base station. When the cleaning robot detects the encoding signal, the cleaning robot moves to the base station for docking or charging. When the cleaning robot does not detect the encoding signal from the base station, the cleaning robot may move along the walls again or move randomly to look for the encoding signal until the cleaning robot detects the encoding signal and returns to the base station successfully.

In another conventional returning mode, a cleaning robot moves along an emitted light from a base station and returns to the vicinity to the base station. The cleaning robot then detects the distance between the cleaning robot and a peripheral object and the position of the peripheral object by use of infrared rays or ultrasonic waves. However, the infrared rays or ultrasonic waves are used only for detecting the distance between the cleaning robot and the peripheral object and the position of the peripheral object, the infrared rays or ultrasonic waves can not confirm whether the object is a base station. Thus, the cleaning robot has to detect an encoding signal emitted from the base station for identifying the base station. By repeating the operations of detecting an object and confirming whether the object is a base station, the cleaning robot can return to the base station successfully.

In the above mentioned conventional base station returning modes, a cleaning robot requires too much time to look for and identify the location of the base station.

Thus, it is desired to provide a moving device and a control method for the moving device. According to the control method, the moving device can reduce the time that is required for the robot to return to the base station.

BRIEF SUMMARY OF THE INVENTION

An exemplary embodiment of a control method for a moving device is provided. The control method comprises the steps of receiving an emitted light from a base station; obtaining a direction from a start position, which the moving device is in, to the base station according to the emitted light to serve as a target direction; driving the moving device to move in the target direction from the start position; defining a target area, wherein when the moving device is in the target area, the moving device can obtain a distance between the moving device and the base station according to the emitted light; obtaining a distance between the moving device and the base station according to the emitted light to serve as a middle distance when the moving device meets a first obstacle which is disposed along the target direction and in the target area; determining whether the middle distance is equal to a predetermined distance; driving the moving device to detour around the first obstacle and move in the target direction continuously when the middle distance is not equal to the predetermined distance; and determining that the first obstacle is the base station and driving the moving device to dock at the first obstacle when the middle distance is equal to the predetermined distance.

An exemplary embodiment of a moving device is provided. The moving device comprises a first receiving device, a driving device, a second receiving device, and a determination device. The first receiving device receives an emitted light from a base station. The first receiving device obtains a direction from a start position, which the moving device is in, to the base station according to the emitted light to serve as a target direction. The driving device drives the moving device to move in the target direction from the start position. The second receiving device receives the emitted light. When the moving device meets a first obstacle which is disposed along the target direction and in the target area, the second receiving device obtains a distance between the moving device and the base station according to the emitted light to serve as a middle distance. The determination device determines whether the middle distance is equal to a predetermined distance. When the determination device determines that the middle distance is not equal to the predetermined distance, the driving device drives the moving device to detour around the first obstacle and move in the target direction continuously. When the determination device determines that the middle distance is equal to the predetermined distance, the driving device determines that the first obstacle is the base station and drives the moving device to dock at the first obstacle.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
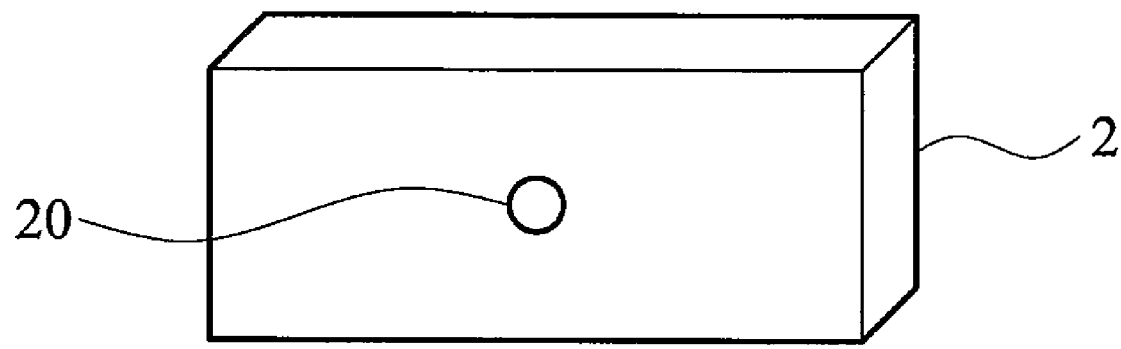
FIGS. 1A and 1B show an exemplary embodiment of a moving device.
Figure 1A:
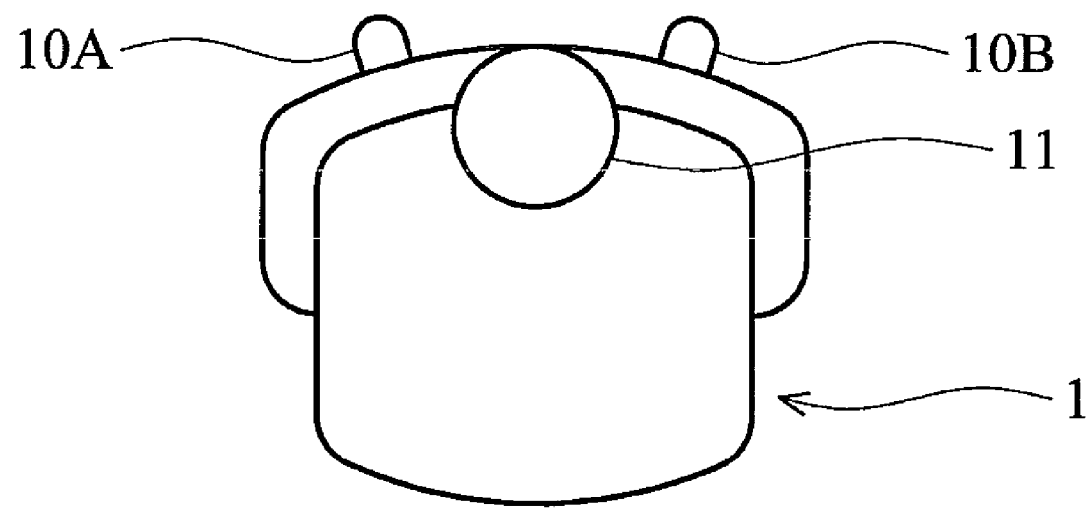
Figure 1B:
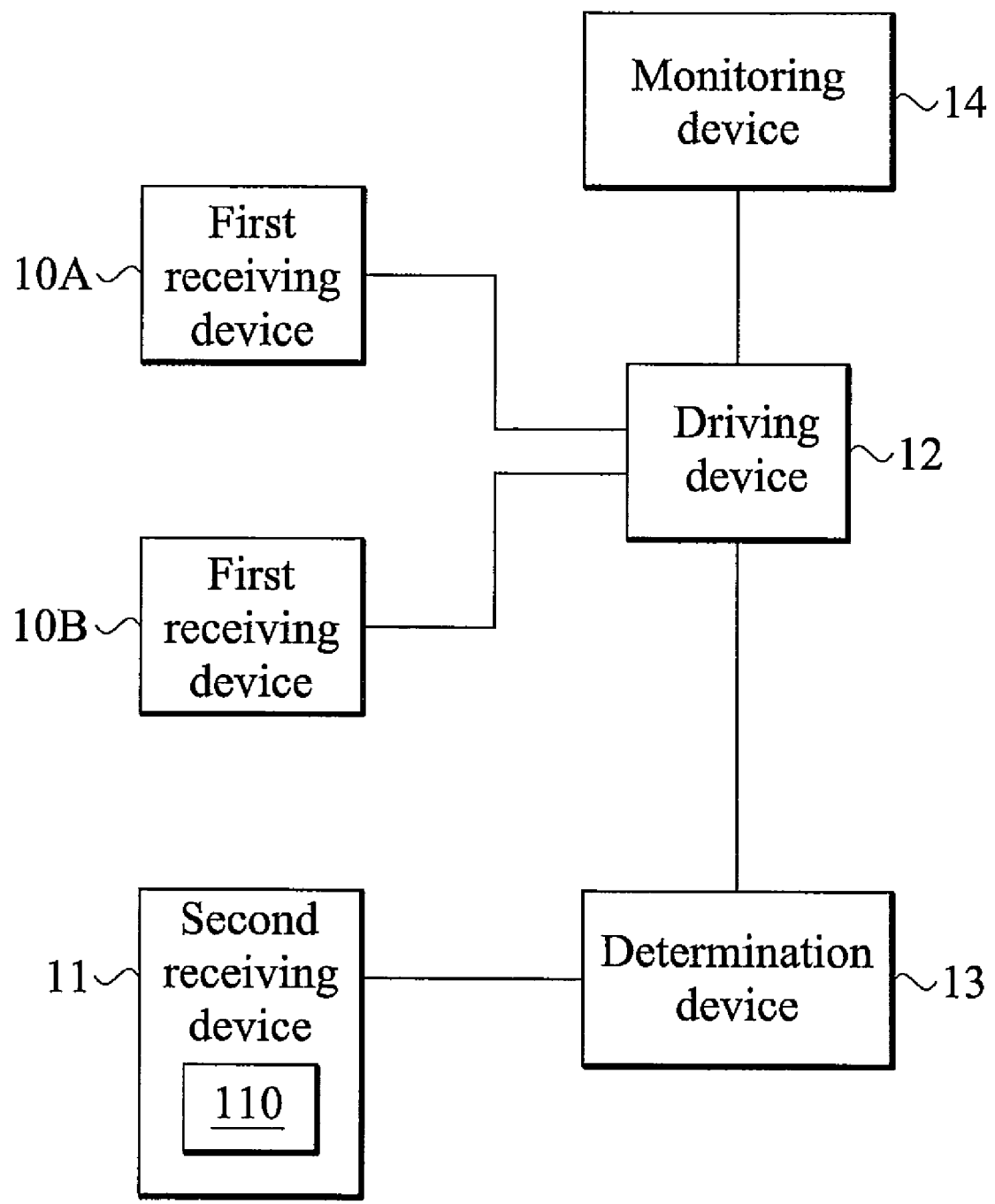

Moving devices are provided. In an exemplary embodiment of a moving devices in FIG. 1A, a moving device 1 can be a movable robot, such as a cleaning robot, which can move along a regulated path or move randomly and return to a base station 2 for docking or charging after a task is finished or low power occurs. Referring to FIGS. 1A and 1B, the moving device 1 comprises at least one first receiving device 10, a second receiving device 11, a driving device 12, and a determination device 13. In the embodiment of FIGS. 1A and 1B, two first receiving devices 10A and 10B are given as an example. The first receiving devices 10A and 10B and the second receiving device 11 receive an emitted light from a light source 20 of the base station 2. The light source 20 can emit an infrared ray by using an infrared emitting diode. The first receiving devices 10A and 10B and the second receiving device 11 receive an emitted light from the light source 20 of the base station 2. However, since the first receiving devices and the second receiving device have different lenses, the first receiving devices and the second receiving device retrieve and analyze different elements of an emitted light from the light source 20.

Figure 2:
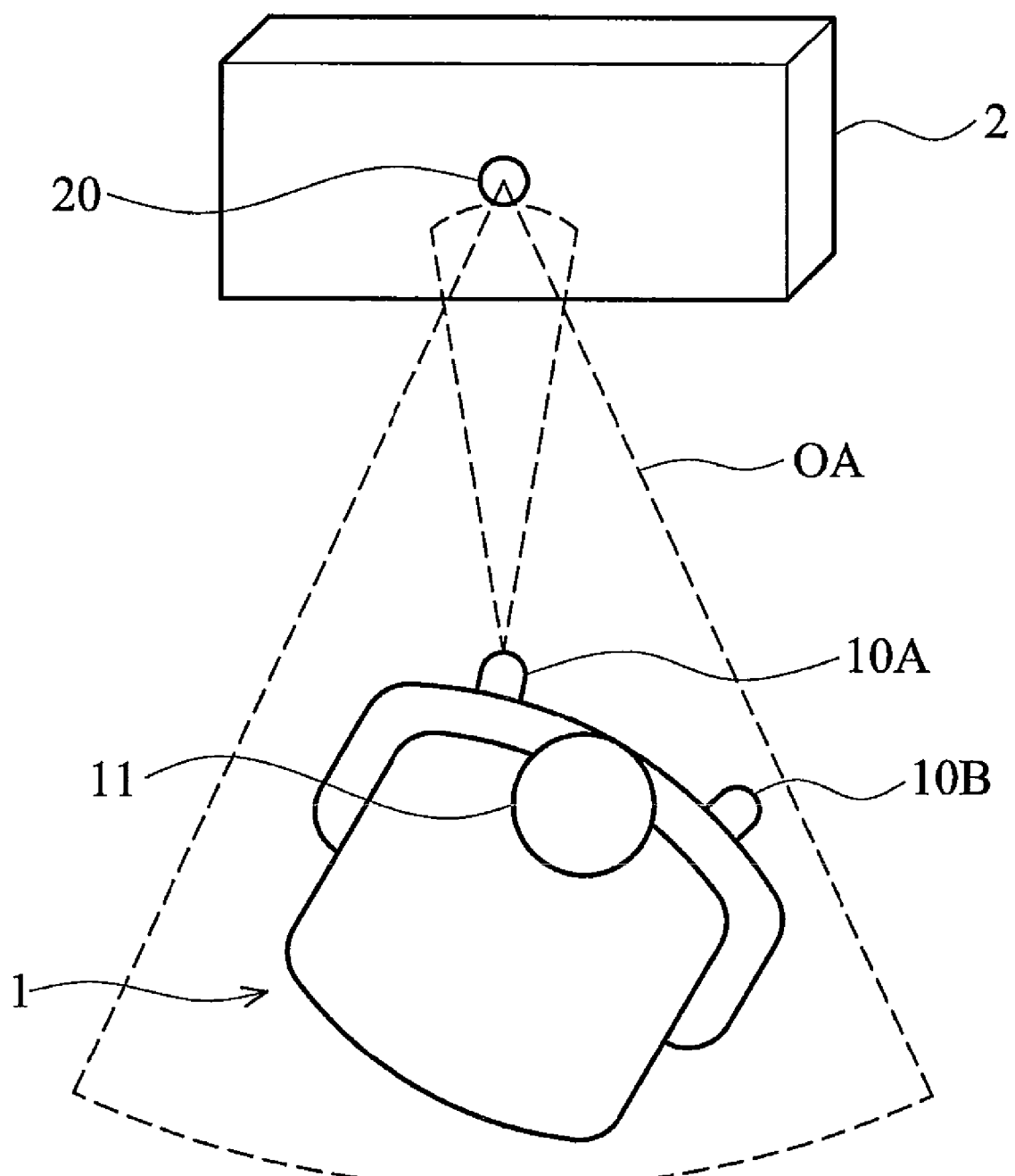
FIG. 2 is a schematic view showing a target direction when the moving device is in a target area.

The first receiving devices 10A and 10B retrieve an encoding signal which is carried on an emitted light and is used to identify the base station 2. When the moving device 1 rotates and one of the first receiving devices 10A and 10B receives the emitted light from the light source 20, the first receiving device identifies the base station 2 according to the received encoding signal on the emitted light. Referring to FIG. 2, in the embodiment, the first receiving device 10A receives the emitted light from the light source 20. At this time, the first receiving device 10A which identifies the base station 2 can obtain a target direction $D_{IR}$ from a start position, which the moving device is in, to the base station 2. The driving device 12 drives the moving device 1 to move in the target direction $D_{IR}$ from the start position.

Figure 3:
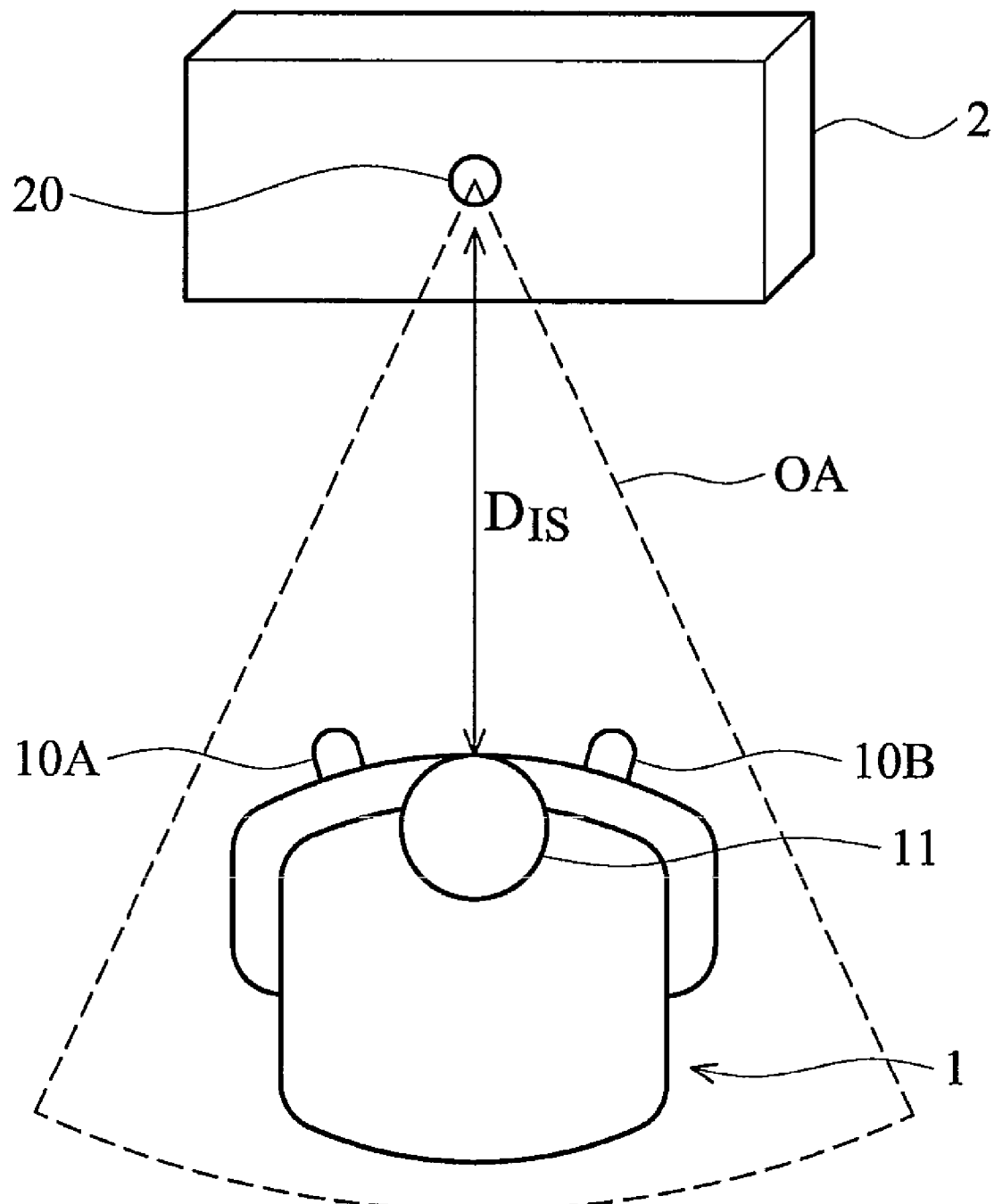
FIG. 3 is a schematic view showing how the distance between the moving device and the base station is obtained in FIGS. 1A and 1B.

The second receiving device 11 also receives the emitted light from the light source 20. Referring to FIGS. 1B, the second receiving device 11 comprises a table 110 which stores a plurality of direction values, wherein each direction value corresponds to one voltage value. Referring to FIG. 3, when the moving device 1 enters a target area OA, the moving device 1 rotates, and the second receiving device 11 receives the emitted light from the light source 20. At this time, the second receiving device 11 obtains a detection voltage value according to the emitted light and then obtains a distance $D_{IS}$ between the moving device 1 and the base station 2 by looking up the table 110 with the detection voltage value. In the embodiment of FIG. 3, the distance $D_{IS}$ indicates the minimum distance between the second receiving device 11 of the moving device 1 and the light source 20.

In the embodiment, the statement "the moving device 1 enters a target area OA" means that the entirety of the moving device 1 enters the target area OA. In other embodiments, the statement "the moving device 1 enters a target area OA" may mean that the center of the moving device 1 enters the target area OA or that the second receiving device 11 of the moving device 1 enters the target area OA.

Figure 4:
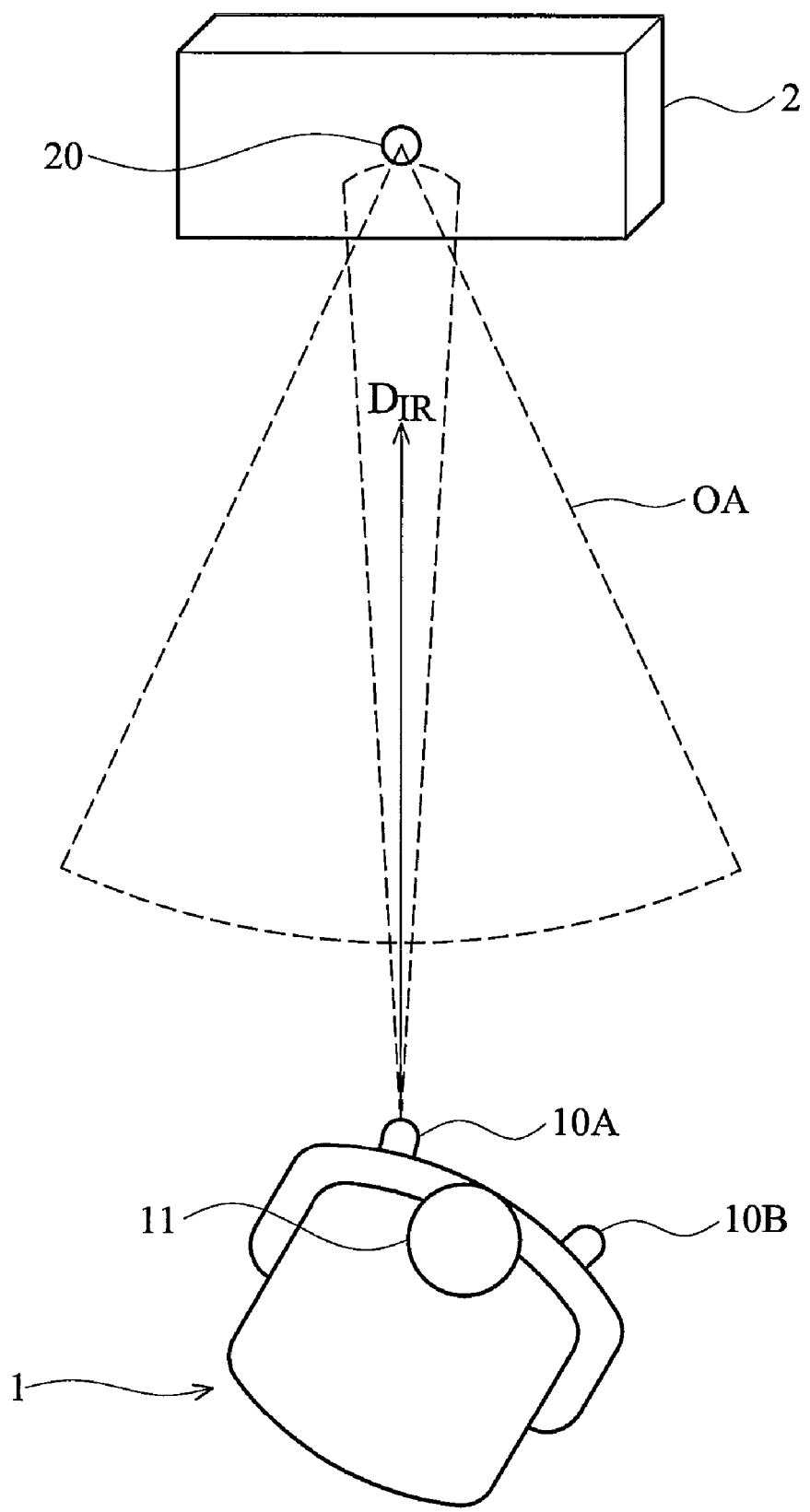
FIG. 4 is a schematic view showing a target direction when the moving device is outside of the target area.

In the embodiment of FIG. 3, the second receiving device 11 can obtain the distance between the moving device 1 and the base station 2 according to the emitted light from the light source 20 only when the second receiving device 11 is in the target area OA. However, the target direction $D_{IR}$ detected by the first receiving device 10A or 10B is not limited by the target area OA. The first receiving device 10A or 10B can obtain the direction from the position which the moving device 1 is in to the base station 2 according to the encoding signal on the emitted light from the light source 20 when the first receiving device 10A or 10B is outside of the target area OA. In the embodiment of FIG. 2, when the moving device 1 enters the target area OA, the start position of the first receiving device 10A is obtained. In other embodiments, such as the embodiment of FIG. 4, when the moving device 1 is outside of the target area OA (that is when the start position of the moving device 1 is outside of the target area OA), the first receiving device 10A or 10B can obtain the direction from the position (the target position) which the moving device 1 is in to the base station 2 according to the encoding signal on the emitted light from the light source 20 to serve as the target direction. Then, when the moving device 1 moves in the target direction and enters the target area OA, the second receiving device 11 obtains the distance between the moving device 1 and the base station 2 according to the emitted light from the light source 20.

During the period when the moving device 1 moves in the target direction, when the moving meets an obstacle, the determination device 13 of FIG. 1B determines whether the obstacle is the base station 2. The term "meets" in the embodiment means that the surfaces of two objects contact with each other or those two objects are very close to each other without actually making contact. In other words, the term "meets" means that the surface of the moving device 1 contacts with the surface of the obstacle or that the moving device 1 and the obstacle are very close to each other but the surface of the moving device 1 does not contact with the surface of the obstacle.

Figure 5:
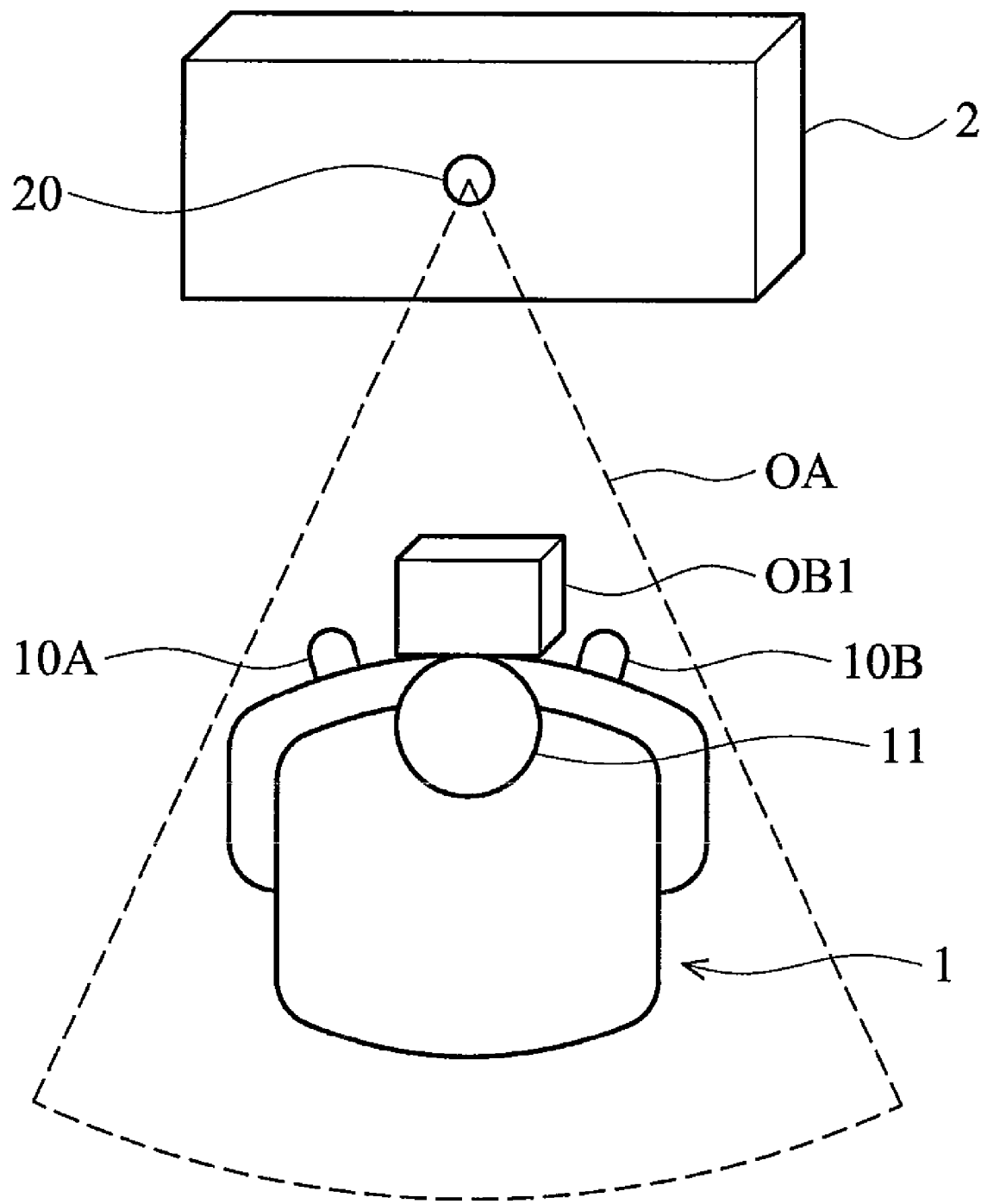
FIG. 5 is a schematic view showing that the moving device meets an obstacle disposed in the target area.

Referring to FIGS. 3 and 5, when the moving device 1 moves to the target area OA in the target direction and meets an obstacle OB1 disposed along the target direction and in the target area OA, the second receiving device 11 obtains a detection voltage value according to the emitted light from the light source 20. At this time, the second receiving device 11 looks up the table 110 with the detection voltage value to obtain the distance between the moving device 1 and the base station 2, which refers to a middle distance. Then, the determination device 13 determines whether the middle distance is equal to a predetermined distance, wherein the predetermined distance has a fixed value. When the determination device 13 determines that the middle distance is not equal to the predetermined distance, the driving device 12 drives the moving device 1 to detour the obstacle OB1 and then move in the target direction until the moving device 1 meets the base station 2. When the determination device 13 determines that the middle distance is equal to the predetermined distance, the driving device 12 determines that the obstacle OB1 is the base station and drives the moving device 1 to dock at the obstacle OB1.

In the above embodiment, the predetermined distance is defined as the distance between the moving device 1 and the base station 2 when the moving device 1 meets the base station 2. For example, when the surface of the moving device 1 contacts with the surface of the base station 2 or when the moving device 1 and the obstacle are very close to each other but the surface of the moving device 1 does not contact with the surface of the obstacle, the minimum distance between the second receiving device 11 of the moving device 1 and the light source 20 of the base station 2 serves as the predetermined distance.

In other embodiments, the distance which is obtained by looking up the table 110 according to the detection voltage value by the second receiving device 11 is the distance between the center of the moving device 1 and the center of the base station 2. In this case, when the surface of the moving device 1 contacts with the surface of the base station 2 or when the moving device 1 and the obstacle are very close to each other but the surface of the moving device 1 does not contact with the surface of the obstacle, the distance between the center of the moving device 1 and the center of the base station 2 serves as the predetermined distance.

Figure 6:
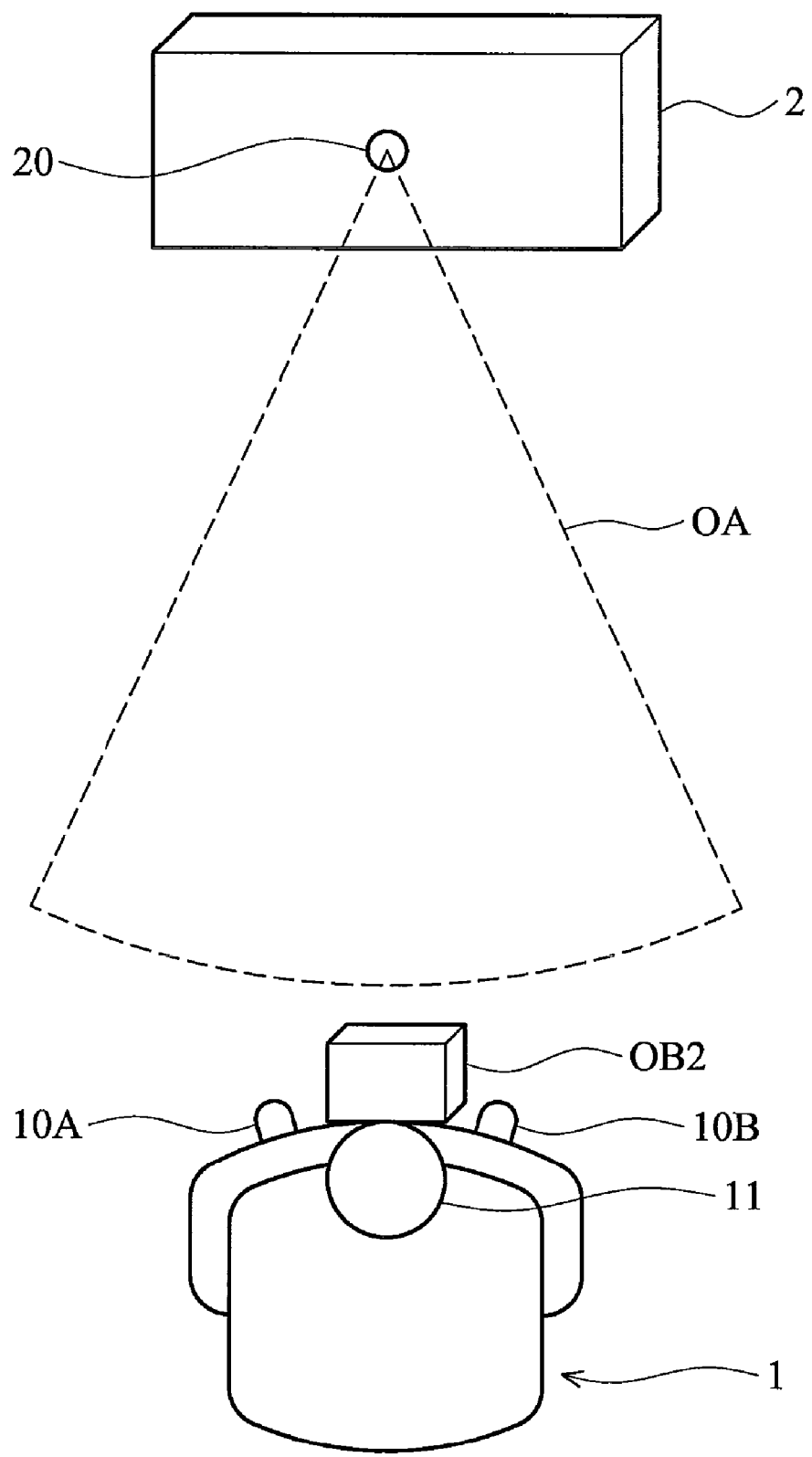
FIG. 6 is a schematic view showing that the moving device meets an obstacle disposed outside of the target area.

Assume that the moving device 1 is outside of the target area OA (that is the start position is outside of the target area OA), and the first receiving device 10A or 10B obtains the target direction. Referring FIGS. 4 and 6, in the period when the moving device 1 moves in the target direction, when the moving device 1 meets an obstacle OB2 disposed along the target direction and outside of the target area OA, the moving device 1 directly detours the obstacle OB2 and moves in the target direction continuously.

Referring to FIG. 1B, the moving device 1 further comprises a monitoring device 14. The monitoring device 14 is used to monitor whether the moving device 1 moves in the target direction. If the monitoring device 14 finds that the moving device 1 deviates from the target direction and moves in a deviated direction, the driving device 12 drives the moving device 1 to return to the target direction from the deviated direction and then move in the target direction.

In the embodiment of FIGS. 1A and 1B, the lens of the second receiving device 11 is an omni lens. Thus, only when the moving device 1 enters the area covered by the emitted light from the light source 20, the second receiving device 11 can receive the emitted light.

Figures 7A, 7B:
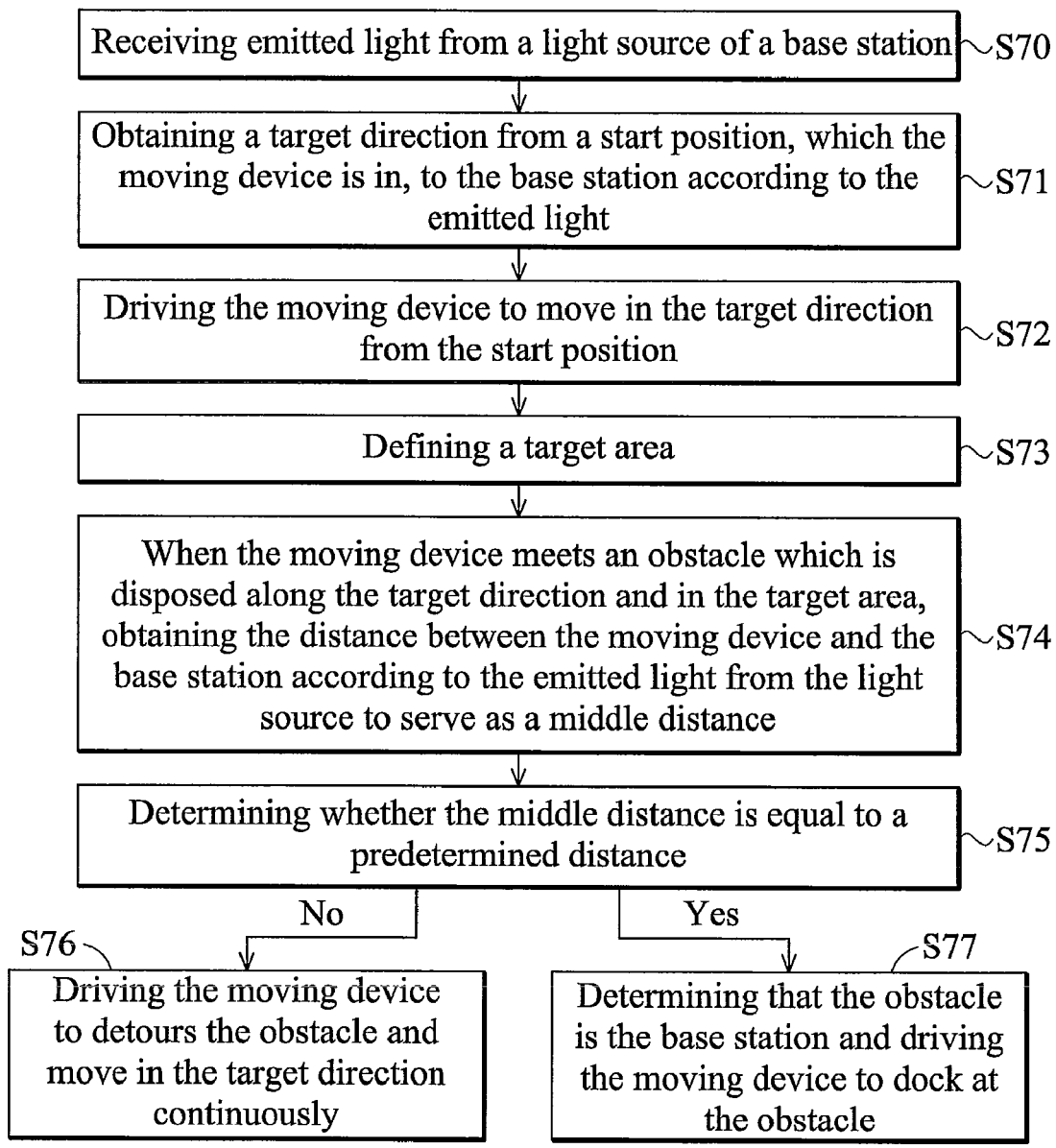
FIGS. 7A and 7B are flow charts of a control method for the moving device of FIGS. 1A and 1B.

FIG. 7A is a flow chart of a control method for the moving device 1 of FIG. 1A. The control method will be described by referring to FIGS. 1A, 1B, and 7A. First, the first receiving device 10A or 10B (the first receiving device 10A is given as an example for the embodiment of FIG. 7A) receives the emitted light from the light source 20 of the base station 2 (step S70). The first receiving device 10A obtains a target direction from a start position, which the moving device 1 is in, to the base station 2 according to the emitted light (step S71). The driving device 12 drives the moving device 1 to move in the target direction from the start position (step S72). A target area is defined (step S73). When the moving device 1 is in the target area, the moving device 1 can obtain the distance between the moving device 1 and the base station 2. When the moving device 1 meets an obstacle which is disposed along the target direction and in the target area, the second receiving device 11 obtains the distance between the moving device 1 and the base station 2 according to the emitted light from the light source 20 to serve as a middle distance (step S74). The determination device 13 determines whether the middle distance is equal to a predetermined distance (step S75). When the determination device 13 determines that the middle distance is not equal to the predetermined distance, the driving device 12 drives the moving device 1 to detours the obstacle and move in the target direction continuously (step S76). When the determination device 13 determines that the middle distance is equal to the predetermined direction, the driving device 12 determines that the obstacle is the base station 2 and drives the moving device 1 to dock at the obstacle (step S77).

In the flow chart of FIG. 7A, step S73 for defining the target area is not limited to occur after the step S72. Step S73 can occur before the step S70, between the steps S70 and S71, or between the steps S71 and S72. Moreover, the start position of the moving device I can be outside of the target area or in the target area.

It is assumed that the start position of the moving device 1 is outside of the target area. Referring to FIG. 7B, when the moving device 1 meets an obstacle which is disposed in the target direction and outside of the target area, the driving device 12 drives the moving device 1 to detour the obstacle and then move in the target direction continuously (step S78).

According to the moving device 1 and the control method therefore, the moving device 1 can quickly obtain the direction to the base station 2 and the position of the base station 2 without an image database. When low power occurs, the moving device 1 can return to the base station 2 for fast charging.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a moving device comprising:
   receiving an emitted light from a base station;
   obtaining a direction from a start position, which the moving device is in, to the base station according to the emitted light to serve as a target direction;
   driving the moving device to move in the target direction from the start position;
   defining a target area, wherein when the moving device is in the target area, the moving device can obtain a distance between the moving device and the base station according to the emitted light;
   obtaining a distance between the moving device and the base station according to the emitted light to serve as a middle distance when the moving device meets a first obstacle which is disposed along the target direction and in the target area;
   determining whether the middle distance is equal to a predetermined distance;
   driving the moving device to detour the first obstacle and move in the target direction continuously when the middle distance is not equal to the predetermined distance; and
   determining that the first obstacle is the base station and driving the moving device to dock at the first obstacle when the middle distance is equal to the predetermined distance.

2. The control method as claimed in claim 1, wherein the start position is outside of the target area.

3. The control method as claimed in claim 2 further comprising:
   when the moving device meets a second obstacle which is disposed in the target direction and outside of the target area, driving the moving device to detour the second obstacle and move in the target direction continuously.

4. The control method as claimed in claim 1, wherein the start position is in the target area.

5. The control method as claimed in claim 1, wherein in the step of obtaining the target direction, the target direction is obtained according to an encoding signal carried on the emitted light, and the encoding signal relates to identification of the base station.

6. The control method as claimed in claim 1 further comprises:
   monitoring whether the moving device moves in the target direction; and when the moving device deviates from the target direction and moves in a deviated direction, driving the moving device to return to the target direction from the deviated direction and then move in the target direction.

7. The control method as claimed in claim 1, wherein the predetermined distance is defined according to a distance between the moving device and the base station when the moving device meets the base station.

8. A moving device comprising:
a first receiving device for receiving an emitted light from a base station, wherein the first receiving device obtains a direction from a start position, which the moving device is in, to the base station according to the emitted light to serve as a target direction;
a driving device for driving the moving device to move in the target direction from the start position;
a second receiving device for receiving the emitted light, wherein when the moving device meets a first obstacle which is disposed along the target direction and in the target area, the second receiving device obtains a distance between the moving device and the base station according to the emitted light to serve as a middle distance; and
a determination device for determining whether the middle distance is equal to a predetermined distance;
wherein when the determination device determines that the middle distance is not equal to the predetermined distance, the driving device drives the moving device to detour around the first obstacle and move in the target direction continuously and;
wherein when the determination device determines that the middle distance is equal to the predetermined distance, the driving device determines that the first obstacle is the base station and drives the moving device to dock at the first obstacle.

9. The moving device as claimed in claim 8, wherein the start position is outside of the target area.

10. The moving device as claimed in claim 9, wherein when the moving device meets a second obstacle which is disposed in the target direction and outside of the target area, the driving device drives the moving device to detour around the second obstacle and move in the target direction continuously.

11. The moving device as claimed in claim 8, wherein the start position is in the target area.

12. The moving device as claimed in claim 8, wherein the first receiving device obtains the target direction according to an encoding signal carried on the emitted light, and the encoding signal relates to identification of the base station.

13. The moving device as claimed in claim 8 further comprises:
a monitoring device for monitoring whether the moving device moves in the target direction;
wherein when the monitoring device determines that the moving device deviates from the target direction and moves in a deviated direction, the driving device drives the moving device to return to the target direction from the deviated direction and then move in the target direction.

14. The moving device as claimed in claim 1, wherein the predetermined distance is defined according to a distance between the moving device and the base station when the moving device meets the base station.

* * * * *